Patented Mar. 28, 1944

2,345,388

UNITED STATES PATENT OFFICE 2,345,388

SUBSTITUTED GUANIDINE SALTS OF ALKYL PHOSPHORIC ACIDS AND THEIR PREPARATION

Walter P. Ericks, Cos Cob, and James H. Williams, Riverside, Conn., assignors to American Cyanamid Company, New York, N. Y., a corporation of Maine No Drawing. Application April 26, 1941, Serial No. 390,536

6 Claims. (Cl. 260—461)

This invention relates to substituted guanidine salts of alkyl phosphoric acids and to their preparation.

We have discovered that the acid alkyl esters of phosphoric acids may be reacted with aliphatic, aromatic, alicyclic or heterocyclic substituted guanidines to form a new class of compounds having unusual surface-active properties. By varying the nature of the groups substituted in the guanidine nucleus and the length of the alkyl group or groups in the phosphoric acid ester it is possible to prepare substituted guanidine salts of alkyl phosphoric acid esters having a wide range of solubilities and surface-active characteristics. The members of this new class of compounds are useful as wetting, detergent, and emulsifying agents, as inhibitors of the precipitation of tetraethyl lead in gasoline, for breaking petroluem oil emulsions, as delayed action activators in rubber vulcanization, in drilling muds for oil and gas wells and many other purposes.

The new class of compounds are prepared by reacting an alkyl substituted phosphoric acid ester having at least one acidic hydrogen in the molecule with an aliphatic, aromatic, alicyclic or heterocyclic substituted guanidine. The aliphatic, aromatic, alicyclic and heterocyclic substituted guanidines which may be prepared by known methods and which may be employed in our process include methyl guanidine, ethyl guanidine, n-butyl guanidine, 1,1-diamyl guanidine, ethylene diguanidine, ethanol guanidine, 1,3-dilauryl guanidine, 1,3-di-o-tolyl guanidine, 2-pyridyl guanidine, 1,3-di-(2-pyridyl) guanidine, 1,3-di-(2-pyridyl)-2-ethylol guanidine, 1,3-dithiazyl guanidine, cyclohexyl guanidine and the like.

The acid esters of phosphoric acids which may be employed include the ortho, meta and pyrophosphoric acids and their polymers having at least one acidic hydrogen in the molecule. The alkyl phosphoric acid esters which are commercially obtainable are generally mixed esters; thus, for example, a sample of butyl-ortho-phosphate employed in the preparation of our new compounds contained upon analysis 90% of mono-n-butyl-ortho-phosphate and about 10% dibutyl-ortho-phosphate. Other alkyl phosphoric acid esters employed by us contained from 70-90% of mono- and 10-30% of di-esters. Consequently the substituted guanidine salts of these esters may be mixtures composed of mono-, di- and tri-guanidino alkyl phosphoric acid ester salts. In the examples which follow we have indicated the compound to be the mono-(substituted guanidine) alkyl phosphoric acid ester salts but it will be understood that the various reactions products may also contain appreciable amounts of the di- and tri-(substituted guanidine) mono-, di- and tri-alkyl phosphates. Of course, should the pure mono-phosphoric acid esters be obtainable we could react them with a required molecular proportion of a substitute guanidine and obtain the mono- or di-(substituted guanidine) monoalkyl phosphate in pure form.

Our new compounds may be prepared by simply reacting an alkyl ester of an ortho-, meta- or pyrophosphoric acid, or polymers thereof having at least one acidic hydrogen with a substituted guanidine at temperatures ranging from room temperature to 100° C., with or without the use of a solvent. When the substituted guanidines themselves are unstable or when they are not available in the free state their solutions may be prepared from their stable salts and then reacted with a phosphoric acid ester. This may be accomplished, for example, by dissolving sodium metal in anhydrous alcohol and then adding to this solution an equimolecular quantity of a substituted guanidine sulfate, hydrochloride or other salt. The solution may be heated and then cooled and filtered to remove the sodium sulfate, sodium chloride, etc. formed in the reaction. The alcoholic solution of the free base may then be used in the preparation of our salts in the manner described in the specific examples which follow.

In order to demonstrate the effectiveness of our new class of compounds as emulsion breakers a series of tests was made on a synthetic emulsion prepared from equal volumes of crude petroleum oil and sea water. The test consisted in adding 2 parts of the compound under test, dissolved in water or toluene, to 10,000 parts of the emulsion, shaking the mixture and allowing it to stand at 60° C., and measuring the volume of water separated at the end of one hour. When evaluated in this manner, representative compounds of our invention were found to separate more water than equivalent quantities of a well-known composition in wide commercial use for this purpose. Ethanol guanidine octyl pyrophosphate was found to be particularly effective as an emulsion breaker. A number of our new class of compounds which were tested and proved to be effective as emulsion breakers include n-butyl guanidine butyl pyrophosphate, n-butyl guanidine octyl pyrophosphate, 1,1-diamyl guanidine amyl pyrophosphate, ethylol guanidine propyl pyrophosphate, 1,3-dilauryl guanidine amyl pyrophosphate and 1,3-di-o-tolyl guanidine methyl pyrophosphate. Some of the members of our new class of compounds including n-butyl guanidine octyl pyrophosphate, ethylol guanidine octyl pyrophosphate and diamyl octyl pyrophosphate were found to be effective in the stabilization of tetraethyl lead in gasoline upon exposure to ultraviolet light. These compounds prevented the formation of a tetraethyl lead haziness in gasoline over a period of time approximately four times greater than was obtained with a control sample of the same gasoline.

Our invention will now be illustrated in greater detail in connection with the following examples which are intended to illustrate in detail the preparation of our new class of compounds but are not to be construed as in limitation thereof since obvious modifications will appear to those skilled in the art.

*Example 1*

6.2 parts by weight of amyl acid pyrophosphate and 28.4 parts by weight of 1.3-dilauryl guanidine were mixed and heated to 70° C. The wax-like material which formed on cooling was believed to be 1.3-dilauryl guanidine amyl pyrophosphate of the formula $$C_5H_{11}O(H_3P_2O_6).C_{12}H_{23}HN.C(:NH)NHC_{12}H_{23}$$

The compound was readily soluble in water but sparingly soluble in cool and hot ethyl alcohol.

*Example 2*

72.3 parts by weight of 1.3-di-o-tolyl guanidine and 19.2 parts by weight of methyl acid pyrophosphate were stirred and heated with 264 parts by weight of benzene at 50–60° C. until a clear solution was obtained. The benzene was evaporated under reduced pressure leaving a hard resin-like material believed to be 1.3-di-o-tolyl guanidine methyl pyrophosphate having the formula

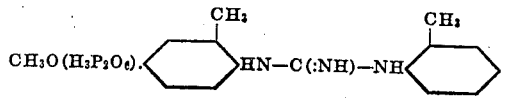

*Example 3* n-butyl guanidine was prepared in the free state by dissolving sodium metal in absolute methyl alcohol, adding a requisite quantity of n-butyl guanidine sulfate to the solution, boiling the mixture for 5 minutes, cooling it and filtering off the sodium sulfate formed. The alcoholic solution of the free compound was then neutralized with butyl-o-phosphoric acid ester and then heated on a steam bath in a shallow dish until all the methanol had evaporated. The compound thus prepared was believed to be n-butyl guanidine butyl-o-phosphate of the formula $$C_4H_9O(H_2PO_3).NH_2-C(:NH)NHC_4H_9$$

and was a wax-like solid easily soluble in water.

*Example 4* n-butyl guanidine octyl pyrophosphate was prepared by neutralizing the methanol solution of n-butyl guanidine described in Example 3 above with octyl pyrophosphoric acid and followed by evaporation of the methanol. The product, $$C_8H_{17}O(H_3P_2O_6).NH_2-C(:NH)NHC_4H_9$$

was a wax-like material sparingly soluble in water but easily dissolved in toluene.

*Example 5*

Ethylol guanidine was prepared from ethylol guanidine sulfate by treatment with sodium methylate followed by removal of sodium sulfate as described in Example 3. The resulting alcoholic solution of ethylol guanidine was then neutralized with octyl pyrophosphoric acid ester and the methanol removed by evaporation. The compound, ethylol guanidine octyl pyrophosphate of the formula $$C_8H_{17}O(H_3P_2O_6).NH_2-C(:NH)NHCH_2CH_2OH$$

was a wax-like solid easily soluble in water.

Ethylol guanidine propyl pyrophosphate was prepared exactly as described in the above paragraph with the exception that the propyl pyrophosphoric acid ester was employed instead of octyl pyrophosphoric acid ester.

*Example 6*

1.1-diamyl guanidine amyl pyrophosphate, $$C_5H_{11}O(H_3P_2O_6).NH_2-C(:NH)N(C_5H_{11})_2$$

was prepared by neutralization of a methanol solution of 1.1-diamyl guanidine with amyl pyrophosphoric acid followed by evaporation of methanol.

What we claim is:

1. Aliphatic substituted guanidine salts of alkyl esters of pyrophosphoric acid.
2. Aliphatic substituted guanidine salts of alkyl esters of orthophosphoric acid.
3. N-butyl guanidine butyl orthrophosphate.
4. N-butyl guanidine octyl pyrophosphate.
5. 1.1-diamyl guanidine amyl pyrophosphate.
6. Aliphatic substituted guanidine salts of alkyl esters of a member of the group consisting of pyrophosphoric acid and orthophosphoric acid.

WALTER P. ERICKS.
JAMES H. WILLIAMS.